(12) United States Patent
LaHousse et al.

(10) Patent No.: US 8,356,793 B1
(45) Date of Patent: Jan. 22, 2013

(54) CARTRIDGE VALVE AND MANIFOLD ASSEMBLY

(75) Inventors: Shane LaHousse, Ann Arbor, MI (US); Gustavo Villegas, Novi, MI (US)

(73) Assignee: Numatics, Incorporated, Novi, MI (US)

( * ) Notice: Subject to any disclaimer, the term of this patent is extended or adjusted under 35 U.S.C. 154(b) by 27 days.

(21) Appl. No.: 12/840,367

(22) Filed: Jul. 21, 2010

Related U.S. Application Data

(62) Division of application No. 11/906,231, filed on Oct. 1, 2007.

(51) Int. Cl.
*F16K 31/02* (2006.01)

(52) U.S. Cl. .................. 251/129.15; 251/360; 251/362

(58) Field of Classification Search ............ 251/129.15, 251/359, 362, 363, 365; 403/361, 381
See application file for complete search history.

(56) References Cited

U.S. PATENT DOCUMENTS

| | | | | |
|---|---|---|---|---|
| 1,700,632 | A * | 1/1929 | Gay | 251/149.1 |
| 4,845,819 | A * | 7/1989 | Kyomen et al. | 29/890.126 |
| 5,044,401 | A | 9/1991 | Giesler et al. | |
| 5,072,752 | A | 12/1991 | Kolchinsky | |
| 5,361,802 | A | 11/1994 | Kroll et al. | |
| 5,636,662 | A | 6/1997 | Olson | |
| 6,269,834 | B1 * | 8/2001 | Huhnen | 137/269 |
| 6,460,826 | B1 | 10/2002 | Rezvani | |
| 2005/0218364 | A1 | 10/2005 | Ohi et al. | |
| 2006/0226384 | A1 | 10/2006 | Hygema | |

FOREIGN PATENT DOCUMENTS

WO  WO 2006/114447 A1  11/2006

* cited by examiner

*Primary Examiner* — John K Fristoe, Jr.
*Assistant Examiner* — Marina Tietjen
(74) *Attorney, Agent, or Firm* — Reising Ethington P.C.

(57) ABSTRACT

A valve manifold has at least one valve receptacle for threadlessly receiving and seating a cartridge valve. A threadless valve nose engages the cartridge valve with the manifold to provide an increased diameter central orifice for improved fluid flow.

8 Claims, 6 Drawing Sheets

CARTRIDGE VALVE AND MANIFOLD ASSEMBLY

RELATED APPLICATION

This application is a division of prior pending application U.S. Ser. No. 11/906,231 filed on Oct. 1, 2007 and Applicants hereby claim the benefit under 35 U.S.C. §120.

TECHNICAL FIELD

The field of this invention relates to a quick connect cartridge valve and manifold assembly.

BACKGROUND OF THE DISCLOSURE

Cartridge valves have long been commonly used and in connection with a wide variety of applications for example the control of industrial tools. Cartridge valves are generally cylindrical in shape, are often solenoid actuated and are connected to a valve manifold. The valve manifold may contain many cartridge valves to independently control multiple functions of tools.

The cartridge valve has an overall cylindrical shape due to the solenoid coil with a plunger slideably positioned within the coil. The valve often has a central valve passage through a centrally located nose and a second valve opening radially spaced outward of the first valve passage. The valve seat is located about the central first valve passage to seat the plunger that is actuated by energizing the solenoid coil. Cartridge valves may be normally open valves that are closed when actuated or normally closed valves that are opened when actuated.

Known connections between the cartridge valve and the manifold have been often a threaded connection. The threaded connection can be about the nose of the cartridge valve that threadably engages complementary threads in the valve manifold. The flow capacity of the valve of a predetermined outer diameter is often dictated by the maximum diameter of the central valve passage commonly called the valve orifice that can be placed through the central nose. In turn, the maximum diameter of the central valve passage is constrained by the dimensions of the outer threads and the thickness of the nose wall for adequate structural strength.

What is needed is an improved cartridge valve with improved flow capacity that easily connects to and disconnects from the valve manifold.

SUMMARY OF THE DISCLOSURE

In accordance with one aspect of the invention, a cartridge valve and valve manifold assembly has a valve manifold with at least one valve receptacle for receiving and seating a cartridge valve. The valve receptacle has an inner valve nose with a passage therethrough. A second passage is positioned outside of the valve nose leading from the valve receptacle. The cartridge valve has an outer valve body sealingly seatable in the valve receptacle and has an actuator device therein. A movable plunger is moveable by the actuator device between an open position unseated away from the valve nose to provide open fluid communication between the first and second passage and a closed position seated against the valve nose to close off the first passage from the second passage.

Preferably, the valve manifold receptacle and the cartridge valve have a positive releasable lock device to releasably lock the cartridge into the valve receptacle. It is desirable that the releasable positive lock device is in the form of a flexible tab on one of the manifold and cartridge valve and a receiving groove on the other of the cartridge valve and manifold.

In one embodiment, the manifold is made of a molded plastic material with the valve nose integrally and simultaneously formed as a unitary section of the manifold. In one embodiment, the movable plunger has a stop shoulder that abuts the valve body to retain the plunger with the cartridge valve.

According to another aspect of the invention, a noseless cartridge valve assembly for seating in a valve manifold has an outer valve body, an actuation device for actuating a moveable plunger between an open and closed position, and the moveable plunger having a first seal thereon and extending into a chamber in an outer valve body for seating on a nose in a cartridge manifold receptacle. Preferably, the cartridge valve assembly has a locking tab assembly extending from the outer body for engagement to a valve manifold. The proximate end of the outer body is constructed to seat a second seal member that engages an inner wall of the receptacle. Preferably, the movable plunger has a stop shoulder to abut the valve body to retain it to the cartridge valve. Furthermore, the valve outer body has a central aperture to slidingly receive the plunger and a port passing therethrough to provide fluid communication from the receptacle to the valve body to provide fluid transfer to and from the receptacle to the valve body to prevent vacuum lock of the plunger.

In accordance with another aspect of the invention, a cartridge valve assembly has an outer valve body with a solenoid coil assembly for actuating a moveable plunger between an open and closed position. A valve seal is about the body for sealing securement to a valve manifold. A threadless valve nose is positioned within the radial confines of the valve seal. A first valve opening and second valve opening are both within the radial confines of the valve seal with the second valve opening extending through the threadless valve nose. The moveable plunger is operable between a closed position to abut the threadless valve nose seat to close off the first opening from the second opening and an open position away from the valve nose seat to allow flow between the first valve opening and the second valve opening.

In accordance with another aspect of the invention, a valve manifold for seating a plurality of cartridge valves has a plurality of valve receptacles for receiving and seating a respective cartridge valve. Each valve receptacle has an inner valve seat surrounding a first passage and a second passage placed outside of the inner valve seat. The valve receptacle has an annular wall shaped to sealingly engage and lock the cartridge valve about its periphery in place in the receptacle against normal fluid pressure in the manifold.

Preferably, the annular wall has an inner surface shaped to engage and lock the cartridge valve in place. In one embodiment, the inner surface has an annular groove therein with a distal lip above the groove for engagement with a locking tab on the cartridge valve.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENT

Figure 1:
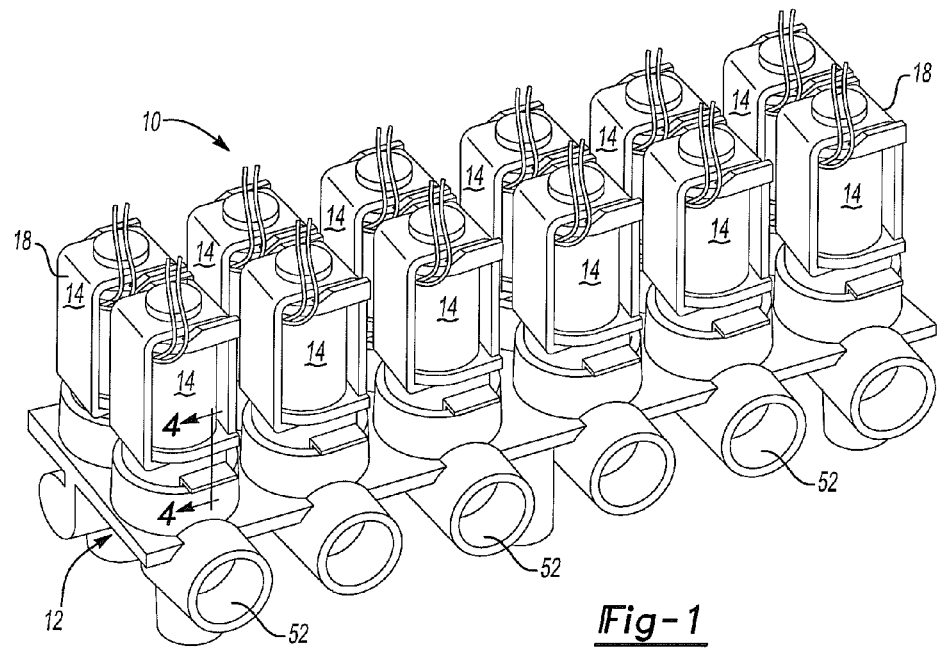
FIG. 1 is a perspective view of a cartridge valve and manifold assembly according to one embodiment of the invention.

Referring in more detail to the drawings, FIG. 1 illustrates a cartridge valve and manifold assembly 10 with a manifold 12 and a plurality of cartridge valves 14 seated in the manifold 12.

Figure 3:
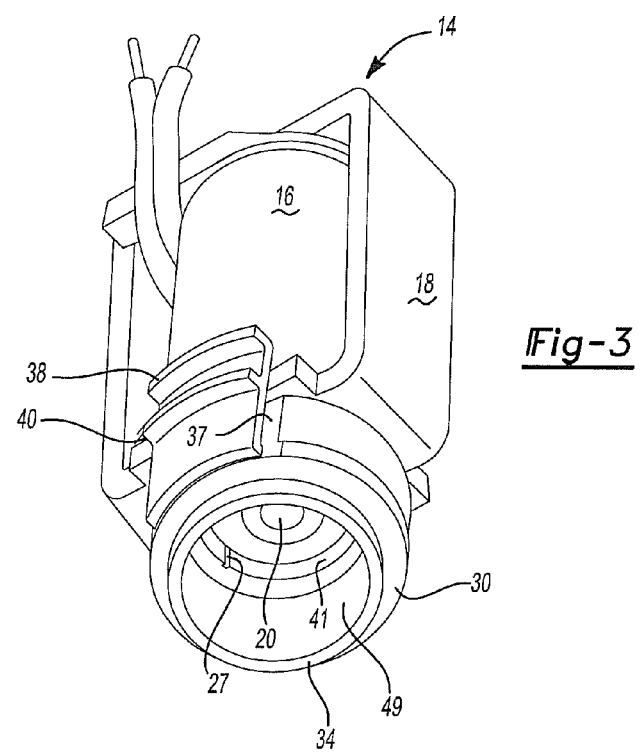
FIG. 3 is a bottom perspective view of the cartridge valve as shown in FIG. 2.
Figure 2:
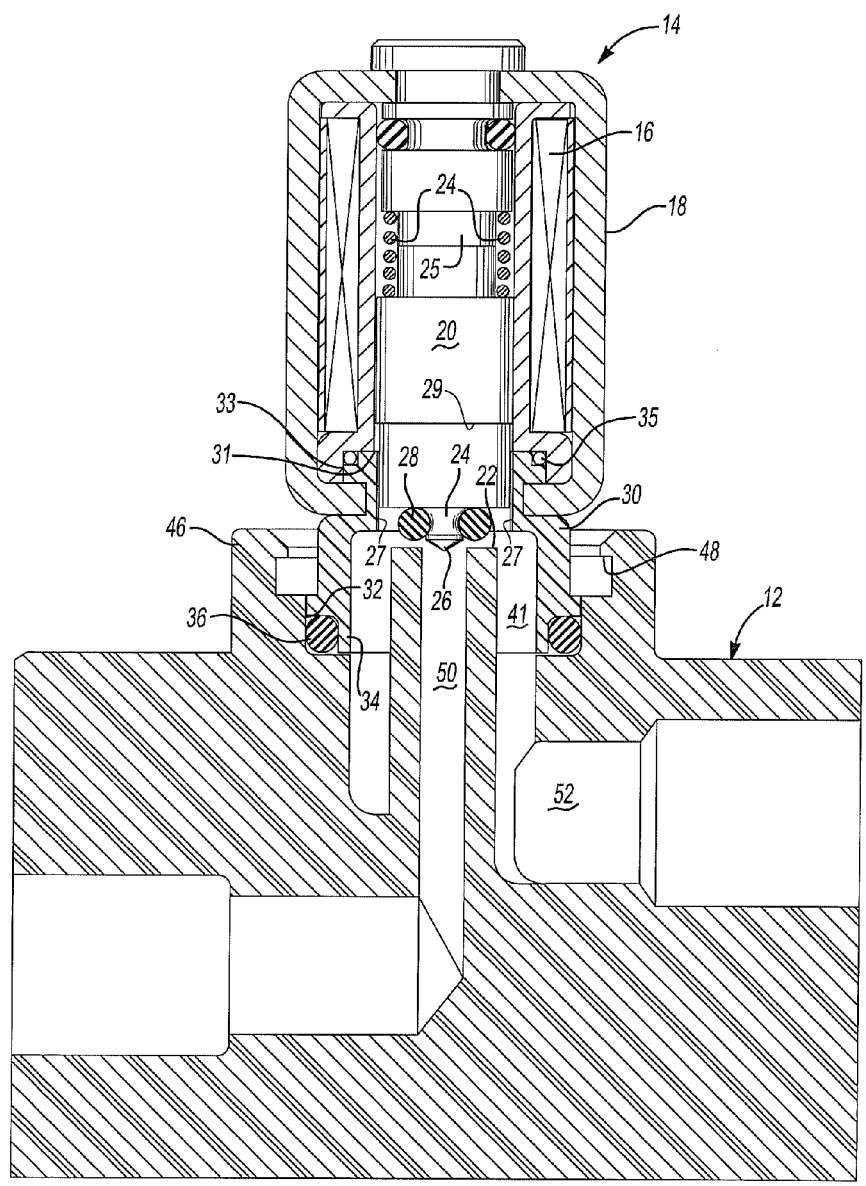
FIG. 2 is an enlarged sectional view showing one cartridge valve and manifold receptacle as shown in FIG. 1.
Figure 4:
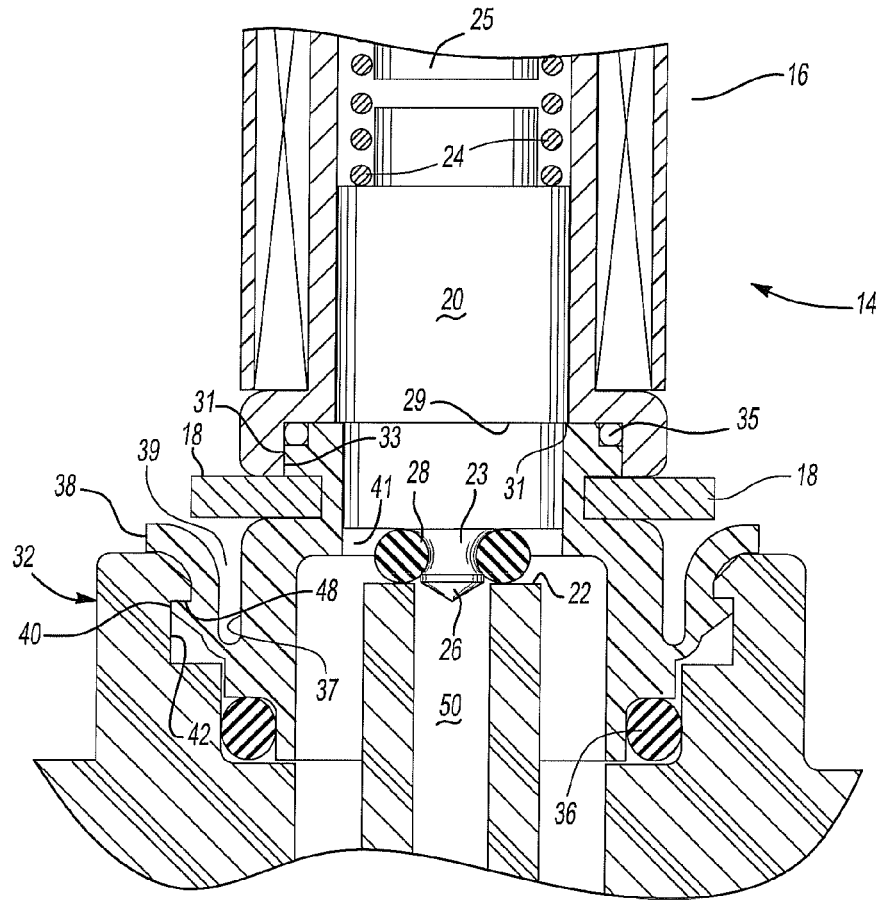
FIG. 4 is a fragmentary cross-sectional view taken along lines 4-4 shown in FIG. 1.
Figure 5:
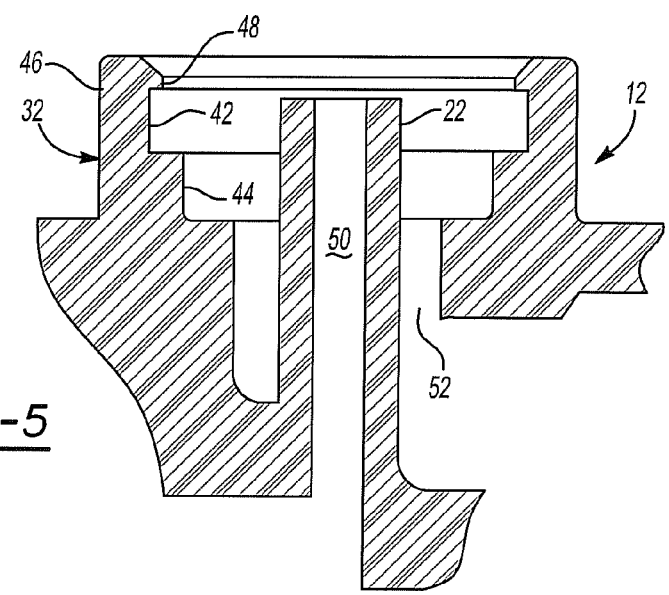
FIG. 5 is a fragmentary sectional view of the manifold receptacle shown in FIG. 1.

As more clearly shown in FIGS. 2-4, each cartridge valve 14 has a solenoid coil assembly 16 mounted to an open cage body 18. A valve plunger 20 is slidingly received in the solenoid coil 16 and is spring biased by spring 24 to a closed position with respect to a nose 22 in manifold 12. Upon actuation of the solenoid coil 16, the plunger is lifted against the bias of spring 24 and gravity to lift from nose 22 until it abuts against stop 25. The plunger 20 has a groove 23 near its distal end 26 which houses a sealing gasket 28 such as an O-ring that can seal against nose 22. The plunger 20 also has a step 29 that abuts an inner shoulder 31 of a valve mounting sleeve 30 to prevent the plunger 20 from exiting the cartridge valve 14.

The valve mounting sleeve 30 is secured at the bottom of the cage 18. The sleeve has an outer shoulder 33 that seats gasket 35 that is carried by the solenoid coil assembly 16. The sleeve 30 is generally annular in shape with a central aperture 41. The sleeve 30 is sized to sealingly fit in a receptacle seat 32 of the manifold 12. The sleeve 30 has two grooves 27 running through aperture 41 down from inner shoulder 31. The valve sleeve 30 has a distal end 34 that seats a sealing gasket 36 such as an O-ring thereabout to seal the valve sleeve 30 with the receptacle seat 32. As shown more clearly in FIGS. 3 and 4, a portion of the valve sleeve 30 forms two opposing flexible tabs 38 that can be manually operated to be squeezed toward the cage 18 for disengagement and be normally resiliently flexible to an outward position for engagement to the receptacle 32. The tabs 38 have a lower locking flange 40 that can engage a groove 42 at an inner surface 44 of the receptacle wall 46 of receptacle 32. The groove 42 of the wall 46 has an upper lip 48 which axially locks the lower locking flange 40 in place. Disengagement of the locking flange 40 from the groove 42 and lip 48 is accomplished by manual squeezing of the tabs 38 generally radially inward a sufficient distance toward the cage 18 to disengage the flange 40 from the groove. The tabs 28 are constructed to be yieldably normally resiliently biased to the engaged position as shown in FIG. 4. The sleeve 30 has two flats 37 behind the tabs 38 to provide respective clearances 39 for the respective tabs 38 to flex radially inward. The tabs 38 are integrally formed with the valve sleeve 30.

The sleeve 30 forms an open ended chamber 49 therein. As shown in FIG. 4, the valve is normally in a closed position with the plunger 20 extending through sleeve 30 and sealingly engaging a seat on nose 22 within chamber 49. When the solenoid coil 16 is actuated, the plunger 20 lifts off of nose 22 to the retracted position shown in FIG. 2 to provide fluid communication between a first passage 50 through the nose 22 to open ended chamber 49 and a second passage 52 through the receptacle 32 around the exterior of the nose 22.

In this fashion the nose 22 which is integrally formed with the manifold 12 extends into the receptacle 32 and is in direct engagement with the valve plunger 20. The cartridge valve 14 has no nose of its own and as such elimination of a sealing gasket found in the prior art is possible. Furthermore, the stepped plunger 20 is retained in the cartridge valve 14 even when the cartridge valve is removed from the manifold assembly. In this fashion, the noseless cartridge valve can be shipped as an unitary component.

The noseless cartridge valve 14 provides for a first passage 50 that can have a significantly greater cross sectional flow area compared to other passages for a comparable sized cartridge valve. The tabs, flanges and lip provide for locking the valve into the manifold against the greater pressures and forces possible through the increased size of the effective area of the sleeve 30 and plunger 20. The inner grooves 27 allow for air displacement during energization to transfer from behind the plunger 20. Furthermore, the grooves 27 prevent a vacuum lock condition that would hold the plunger in the retracted energized position.

Figure 6:
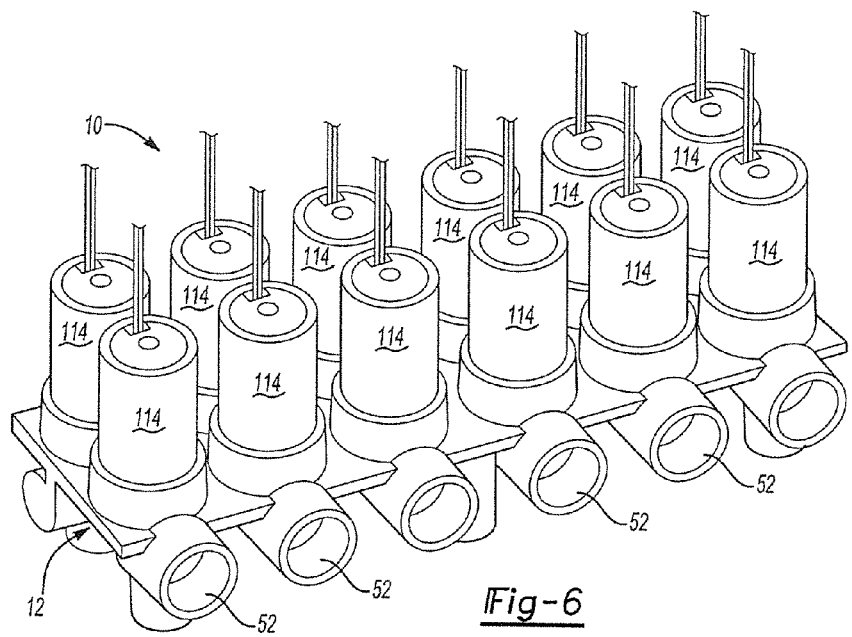
FIG. 6 is a perspective view of a second embodiment of a cartridge valve and manifold assembly.
Figure 7:
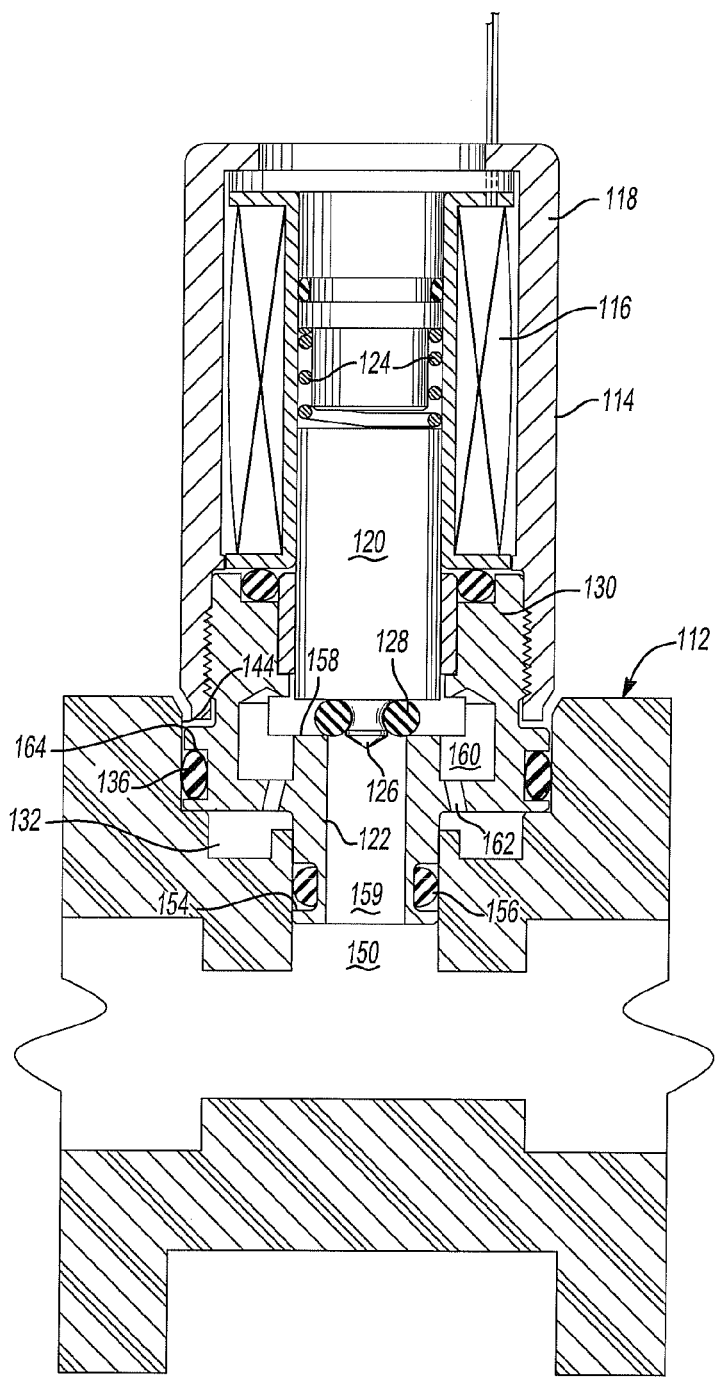
FIG. 7 is an enlarged sectional view showing one normally closed cartridge valve and manifold receptacle as shown in FIG. 6.

While the above manifold with an integral nose and improved noseless cartridge valve provides increased flow rates, there may be occasions where an improved quick connect cartridge valve 114 as shown in FIGS. 6 and 7 may have a central nose 122 and be fitted to manifolds that do not have an integrally formed nose. The improved normally closed cartridge valve 114 fits into a plastic manifold 112. The plastic manifold 112 does not have the nose or the lip found in the previously described manifold. It has a first central passage 150 and a second passage 152 as shown in FIG. 8 that is in communication with each receptacle 132.

Figure 9:
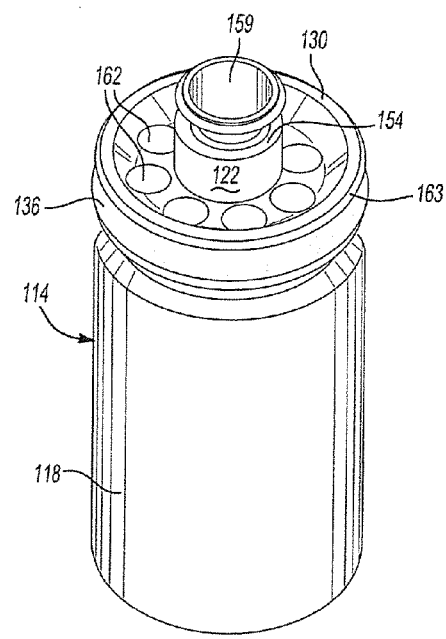
FIG. 9 is a bottom perspective view of the cartridge valve shown in FIG. 6.

As more clearly shown in FIGS. 7 and 9, the cartridge valve 114 has a closed casing 118 housing the solenoid coil 116 and plunger 120. A valve sleeve 130 is threaded or otherwise secured to the casing 118. The valve sleeve 130 has a central nose 122 with an external groove 154 for seating a gasket 156 such as an O-ring that sealingly fits within passage 150. The passage wall is threadless for a sliding fit of the gasket 156. The nose 122 has an upper integral seat 158 that is engaged and sealed by the plunger end 126 and its sealing gasket 128. The nose has a central passage 159 that is in communication with passage 150. The valve head body 130 provides an internal chamber 160. A plurality or peripheral ports 162 about the nose 122 extend through the valve head body 130 that are in fluid communication with the receptacle 132 and second passage 152.

The outer periphery 163 of the valve sleeve 130 has a groove 164 for a sealing gasket 136 such as an O-ring that frictionally fits and seals within the receptacle 132. The receptacle is threadless for a sliding fit of gasket 136. The inner wall surface 144 of the receptacle has a slight negative cavity slope to provide a slight snap fit to retain the sealing gasket 136 in the receptacle 132. The manifold is sized such that the manifold material will expand around the receptacle region under stress to accommodate the insertion of the O-ring and valve body. Once the body and O-ring have been fully inserted, the manifold receptacle wall 144 resiliently springs back to its unstressed size and retains the valve body and O-ring. The manifold may be made from a plastic material which allows it to be molded and have the sufficient resilient elasticity to provide the snap fit. For example, commercially available Teijin Panlite 1250Y polycarbonate may be used. Other plastics, for example, GE Lexan 101 polycarbonate may also be suitable. Stronger plastics or typical commercially available aluminum may also be suitable The cartridge valve 114 is pushed into the receptacle 132 to sealingly engage and be ready for operation. As shown, the valve is normally in the closed position but actuation of the plunger 120 overcomes the bias of spring 124 to lift off the nose seat 158 and place passage 150 into fluid communication with passage 152.

Figure 8:
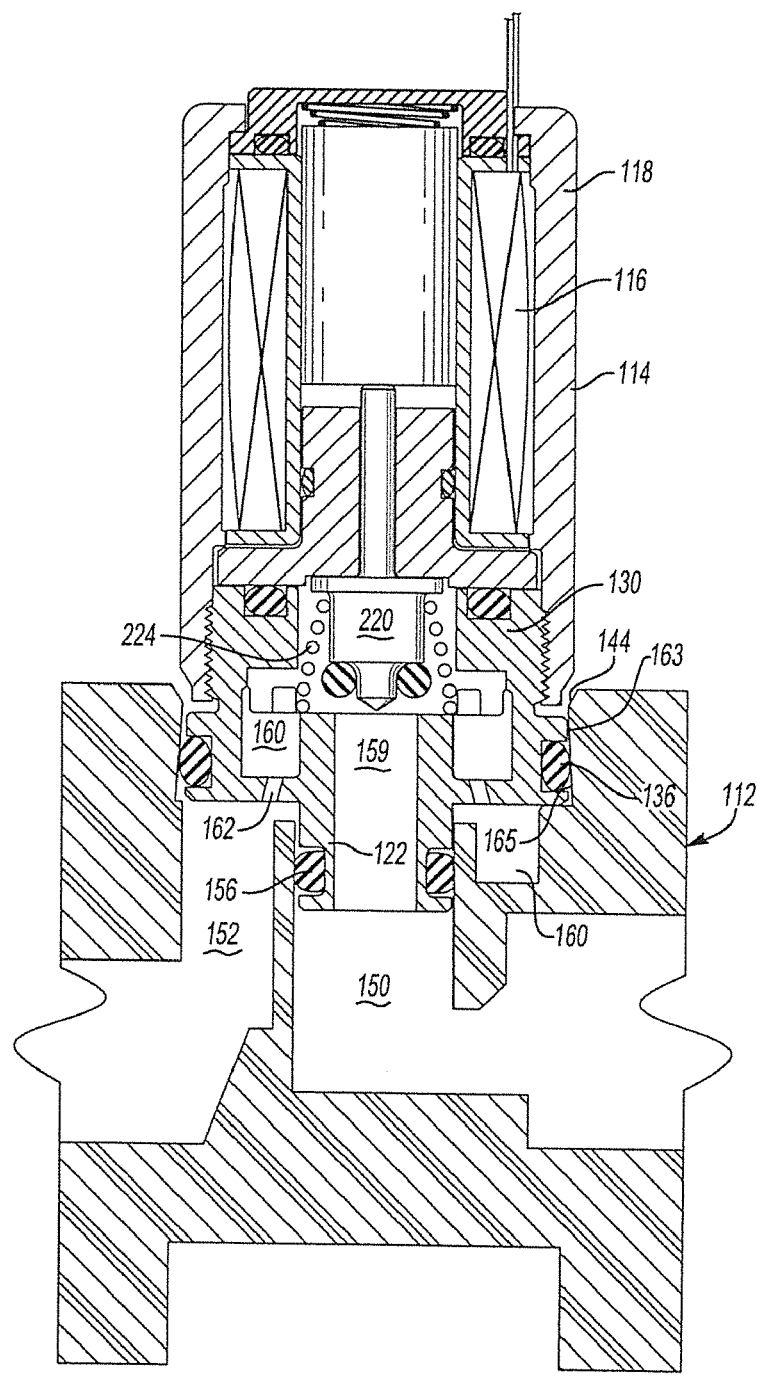
FIG. 8 is an enlarged sectional view showing a normally open cartridge valve and manifold receptacle as shown in FIG. 6.

Of course the cartridge valve 114 may be constructed to be normally open as shown in FIG. 8 where the internal mechanism has a plunger 220 constructed to receive a coil spring 224 that normally biases the plunger 220 to the open position and actuation of the solenoid coil 116 moves the plunger 220 to engage the nose 122 and close off the passage 150 from passage 152.

While old thread designs for a particular size cartridge valve left a central passage or orifice having a diameter of 0.100 inch, the nose 122 by being threadless can be provided with an orifice or central passage 159 being greatly increased to a diameter of 0.161 inch for a comparable sized valve. The central passage bottleneck is greatly alleviated and the small cartridge valve is capable of providing significantly greater flow rates at higher output pressures. Elimination of the nose from the cartridge valve and substituting the nose and its nose seat onto the manifold as shown in FIGS. 1-5 provides even greater improvements in flow rates.

Installation time also is greatly decreased by eliminating the threads on conventional noses. One merely pushes or pulls the valve into and out of its installed position. Secondly, the sealing of the valve to the manifold is not dependant on axial compression of the valve and thus is not as sensitive to relative axial location within the manifold interface. The elimination of threads from the central nose also provides for lower cost manufacturing. Shipping of an assembled unit is not compromised due to the step in the plunger which retains the plunger in a noseless cartridge valve.

Variations and modifications are possible without departing from the scope and spirit of the present invention as defined by the appended claims.

The embodiments in which an exclusive property or privilege is claimed are defined as follows:

1. A valve manifold for threadlessly seating a plurality of cartridge valves comprising:
   a single piece of yieldable elastic material having a degree of yieldable resilient elasticity;
   a plurality of valve receptacles formed in said single piece of yieldable elastic material with a plurality of valve receptacles lined up in each of two parallel rows facing the same direction, each valve receptacle constructed for receiving and seating a respective cartridge valve;
   said valve receptacle having an inner valve seat surrounding a first passage and a second passage placed outside of said inner valve seat;
   said valve receptacle having an annular wall shaped to engage and removably secure a cartridge valve in place in said receptacle against normal fluid pressure in said manifold; and
   said annular wall being made having a degree of yieldably resilient elasticity for deformation to accommodate threadless entry, retention, and removal of a cartridge valve and is biased to its unstressed position to securely retain said cartridge valve in said receptacle against said normal fluid pressure and allows repeated, non-permanent deforming removability when a pulling force greater than said normal fluid pressure on said cartridge valve occurs.

2. A valve manifold as defined in claim 1 further comprising:
   said annular wall being made from a plastic material.

3. A valve manifold as defined in claim 1 further comprising:
   said first passage of said inner valve seat being threadless slidingly for receiving a section of said cartridge valve.

4. A valve manifold as defined in claim 1 further comprising:
   said annular wall having an inner surface shaped to engage and lock said cartridge valve in place.

5. A valve manifold as defined in claim 1 further comprising:
   said inner surface having an annular groove therein with a distal lip above said groove for engagement with a locking tab on said cartridge valve.

6. A valve manifold for threadlessly seating a plurality of cartridge valves comprising:
   a single piece of yieldable elastic material having a degree of yieldable resilient elasticity;
   a plurality of valve receptacles formed in said single piece of yieldable elastic material lined up in two parallel rows facing the same direction, each valve receptacle constructed for receiving and seating a respective cartridge valve;
   said valve receptacle having an annular wall with a degree of yieldably resilient elasticity to deform to accommodate entry and repeated non-permanent deforming removability of a cartridge valve and is biased to its unstressed position to engage said cartridge valve in said receptacle to engage and lock against normal fluid pressure in said manifold.

7. A valve manifold as defined in claim 6 further comprising:
   said annular wall being threadless for slideably receiving a section of a cartridge valve and having a negative cavity slope.

8. A valve manifold as defined in claim 6 further comprising:
   said annular wall being made from a plastic material.

* * * * *

UNITED STATES PATENT AND TRADEMARK OFFICE
CERTIFICATE OF CORRECTION

PATENT NO. : 8,356,793 B1
APPLICATION NO. : 12/840367
DATED : January 22, 2013
INVENTOR(S) : Shane LaHousse and Gustavo Villegas It is certified that error appears in the above-identified patent and that said Letters Patent is hereby corrected as shown below:

IN THE CLAIMS:

Claim 1, Column 5, Line 47 - After "receptacles", insert --being--
Claim 1, Column 6, Line 5 - After "wall", delete "being made"

Signed and Sealed this
Fourteenth Day of May, 2013

Teresa Stanek Rea
*Acting Director of the United States Patent and Trademark Office*